Figures 1, 16:
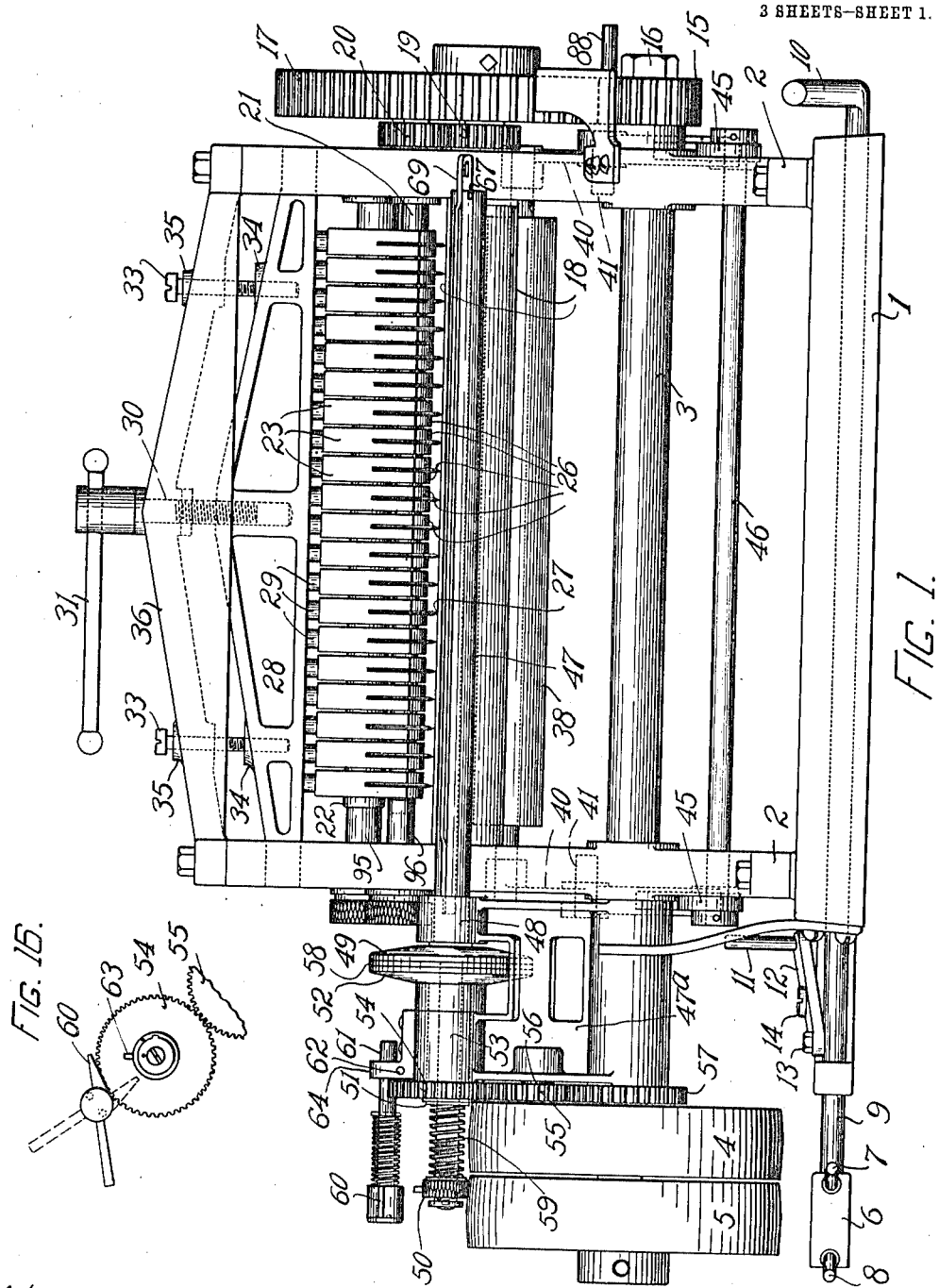

F. W. STORK.
MACHINE FOR CUTTING CLOTH, LEATHER, AND SIMILAR MATERIALS.
APPLICATION FILED MAY 11, 1908.

1,040,587.

Patented Oct. 8, 1912.

3 SHEETS—SHEET 1.

WITNESSES
A. T. Palmer
H. W. Kelso

INVENTOR
Frederick W. Stork
Richard P. Elliott
attorney

F. W. STORK.
MACHINE FOR CUTTING CLOTH, LEATHER, AND SIMILAR MATERIALS.
APPLICATION FILED MAY 11, 1908.
1,040,587.
Patented Oct. 8, 1912.
3 SHEETS—SHEET 2.
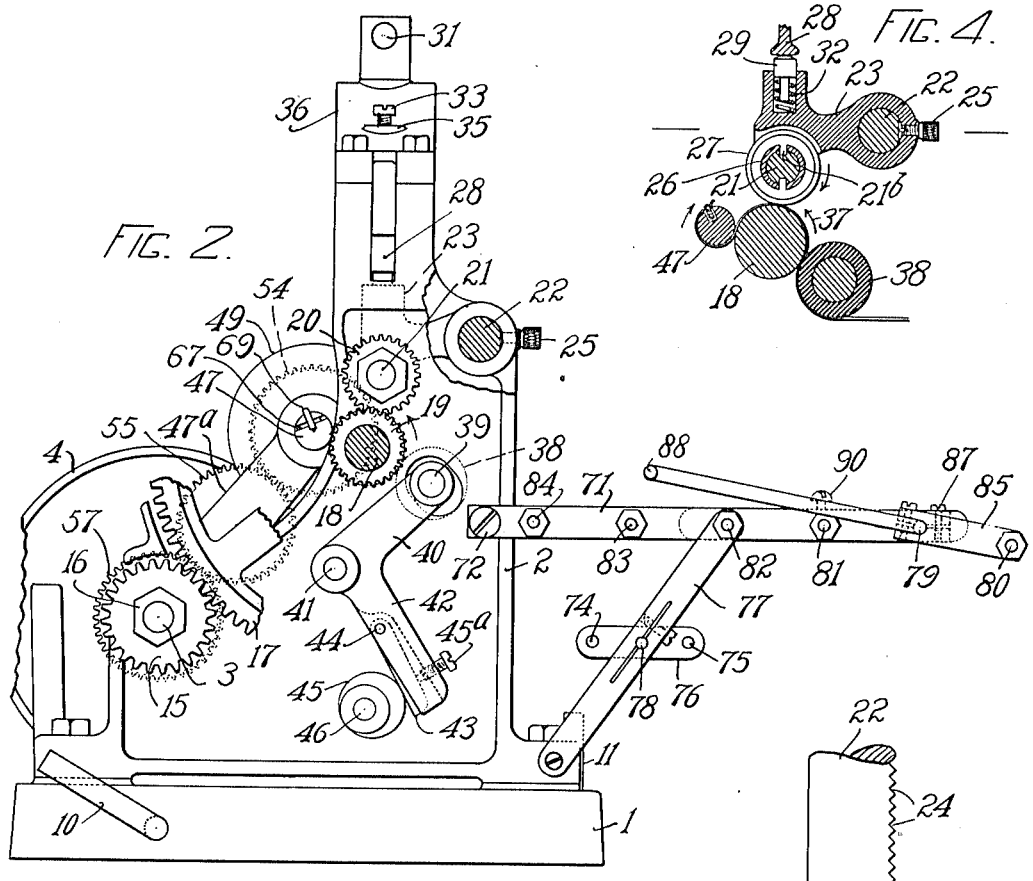

F. W. STORK.
MACHINE FOR CUTTING CLOTH, LEATHER, AND SIMILAR MATERIALS.
APPLICATION FILED MAY 11, 1908.
1,040,587.
Patented Oct. 8, 1912.
3 SHEETS—SHEET 3.
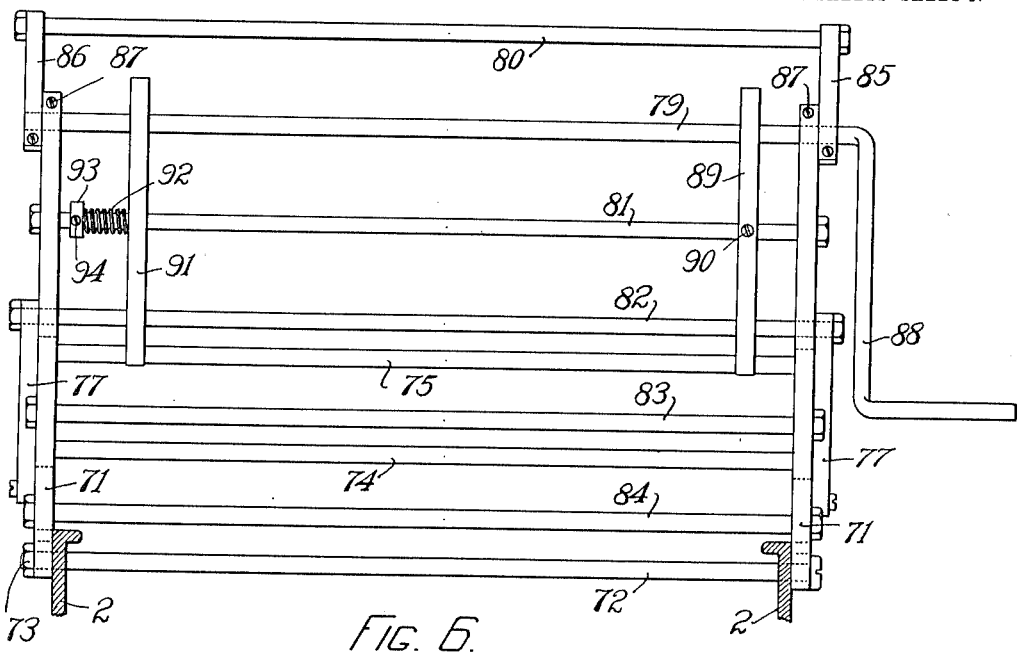
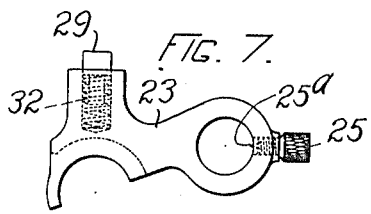
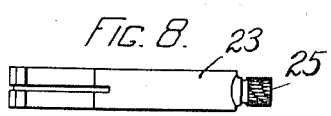
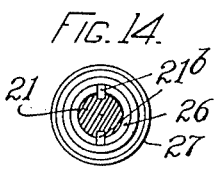
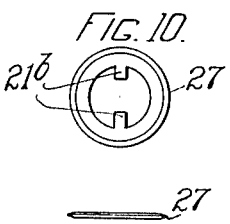
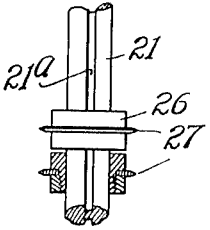
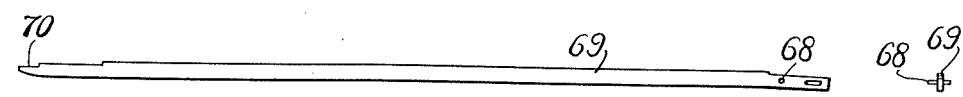
WITNESSES
INVENTOR

UNITED STATES PATENT OFFICE.

FREDERICK W. STORK, OF BOSTON, MASSACHUSETTS, ASSIGNOR, BY MESNE ASSIGNMENTS, TO EXCEL MANUFACTURING COMPANY, OF BOSTON, MASSACHUSETTS, A CORPORATION OF MASSACHUSETTS.

MACHINE FOR CUTTING CLOTH, LEATHER, AND SIMILAR MATERIALS.

1,040,587.  Specification of Letters Patent.  Patented Oct. 8, 1912.

Application filed May 11, 1908. Serial No. 432,104.

*To all whom it may concern:*

Be it known that I, FREDERICK W. STORK, a citizen of the United States, and a resident of Boston, county of Suffolk, and Commonwealth of Massachusetts, have invented certain new and useful Improvements in Machines for Cutting Cloth, Leather, and Similar Materials, of which the following is a specification, reference being had to the drawings accompanying the same and forming a part thereof.

My invention relates to an improvement in a machine for cutting cloth, leather and similar materials.

The object of my invention is to produce a cutting machine having a plurality of independently adjustable rotary cutters for cutting cloth, leather and similar materials, together with other improvements, which will more fully appear from the specification.

In the drawings accompanying this specification and forming a part thereof—Figure 1 is a front elevation of my improved cutting machine; Fig. 2 is a sectional end elevation of same, with one end frame removed; Fig. 3 is a partial plan of one end of my cutting machine; Fig. 4 is an end sectional elevation of the rotary cutter, cutter holder, roll or platen upon which the cutter has a cutting bearing, feed roll and winding shaft; Fig. 5 is a section of the cutter holder and shaft upon which the holder has a bearing; Fig. 6 is a plan of the friction bars which serve to guide the material being cut and to cause sufficient friction upon it to keep it straight and guide it evenly; Fig. 7 is a side elevation of the cutter holder or guide; Fig. 8 is a plan of same; Fig. 9 is an edge view of the cutting disk; Fig. 10 is a plan or side view of same; Fig. 11 is a side view of the collet for the cutter; Fig. 12 is an end elevation of same; Fig. 13 is a section of the driving shaft with two cutters mounted thereon, one of which is in section; Fig. 14 is an end view of the rotary cutter and the driving shaft; Fig. 15 represents a side elevation of the clamping bar which serves to clamp the material to the rotating winding bar; and Fig. 16 is a section of the mechanism which drives the material winding bar.

In the drawings, 1 represents the base of the machine, and 2 the side frames in which is secured the various bearings for the revolving parts of the cutting machine; 3 is the main driving shaft which has mounted on one end the tight pulley 4 and the loose pulley 5, both of which are adapted to receive a belt which serves to revolve the various parts of the mechanism.

6 is a belt shifter having prongs 7 and 8 which serve to guide the belt from the loose to the tight pulley as is usual in machines of this character. The fingers 7 and 8 are mounted on the rod 9 which in turn has a bearing in the frame of the machine and which is free to move longitudinally. The rod 9 is moved by either the handle 10 at one end of the machine or the handle 11 at the other end. The end of the lever 12 is pivoted to the rod 9 by the pivot 13 and at its mid-portion on the pivot 14.

The shaft 3 has secured to one of its ends the driving gear 15 which is held in position by the nut 16. The gear 15 enmeshes into the gear 17 mounted upon one end of the hardened roll or platen 18. The gear 19 is mounted on the platen 18 beside the gear 17 and enmeshes with the gear 20 which is mounted upon and serves to revolve the cutter driving or revolving shaft 21 which revolves in bearings in the frames 2, 2.

The shaft 22 has a bearing at its ends in the frames 2, 2, and has adjustably mounted on it the cutter holders 23 in such manner that they may be adjusted laterally to give divisions of an inch, preferably in multiples of one-sixteenth of an inch; i. e., the shaft 22 is provided with notches 24, 24, etc., extending laterally across a portion of its periphery and shaped to receive the pointed end of the adjusting screws 25 so that the cutter holders 23 may be adjusted laterally the minimum amount of one-sixteenth of an inch, or the maximum of the available space of total length of the shaft, if one cutter only is used. The holder 23 is formed to receive a rotary cutter 27 of the form shown in Fig. 13, and serves to form a bearing for the hub of said cutter and to guide it and hold it in position laterally by means of the slot in said holder which fits upon the thin portion of the cutter. This holder 23 serves the double purpose of forming a bearing for the cutter and holding it in lateral adjustment. The cutting edge of the cutter 27 is so positioned as to bear upon the hardened roll or platen 18 so that cutting pressure may be exerted between the hardened roll or platen 18 and the edge of the cutter 27. The cutting pressure is obtained through the medium of the pressure bar 28, which is pressed down upon the pins 29, 29, etc., by means of the screw 30 which is revolved by the handle 31. This pressure bar 28 extends the full length of the machine and is made in truss form so that it will bear upon all the pins 29 of all the cutters 27 of the machine, whatever their number may be. The amount of pressure exerted on the pins 29 and the cutters 27 through the medium of the spiral spring 32 is determined by the adjustments of the gage screws 33, 33. These screws 33, 33, may be screwed into the portions 34, 34, of the pressure bar 28 a distance proportionate to the amount of pressure which it is desired to exert on the cutters 27, and when so adjusted the screw 30 cannot be screwed downwardly beyond where the heads of the screws 33, 33, contact with the bosses 35, 35, of the truss beam 36 which is secured to the tops of the frames 2, 2, of the machine. The hardened roll or platen 18 revolves in the direction of the arrow 37.

In order to provide feeding friction on the material being cut, I provide a rubber roll 38 which is mounted in the frame of the machine in such manner as to bear against the roll or platen 18 with sufficient tension to grip the material between it and said roll and cause it to be drawn through as the roll or platen 18 revolves. The rubber roll 38 is mounted upon bearings 39 at each end in an L-shaped lever 40. The lever 40 is pivoted upon the pivots 41 secured to the frames 2, 2, which pivots extend through bearings in the L-shaped lever. The ends 42 of the L-shaped levers 40 have the swinging portions 43, 43, pivoted to them by the pivots 44. These swinging portions have a bearing upon eccentrics 45, 45, which are secured on opposite ends of the shaft 46 inside the frame 2, 2. The shaft 46 is mounted in bearings in the frames 2, 2, and is provided with a handle or lever on one end to revolve it. The eccentrics 45, 45, are shown in position where they press the roll 38 against the hardened roll or platen 18. By revolving them around until the high point is in the position opposite to that shown in Fig. 2, the pressure is relieved from the roll 38 so that cloth or other material may be easily inserted between the roll or platen 18 and the rubber roll 38. Adjusting screws 45$^a$ are provided, which serve to press the swinging portions 43 outwardly and to increase the pressure of the roll 38 upon the roll or platen 18, or decrease it, as the case may be.

The shaft 3 has a bracket 47$^a$ mounted upon it between the frame 2 and the pulley 4. This bracket has mounted upon it mechanism for winding the material into rolls as it passes through the rotary cutters, and is cut into strips. This winding mechanism consists of the shaft 47 which revolves in the bearing 48 formed in one side the bracket 47$^a$. The shaft 47 is provided with a disk 49 secured to it against rotation. The outer end of the shaft 47 is screw-threaded and has mounted upon it a round knurled nut 50. It also has a sleeve 51 upon the inner end of which is formed a friction disk 52, the sleeve 51 having a bearing in the portion 53 of the bracket 47$^a$. To the outer end of the sleeve 51 is secured the gear 54 which serves to drive said sleeve through the medium of the intermediate gear 55 which revolves upon the stud 56 and which enmeshes with the gear 57 which is secured to the shaft 3 against rotation. A disk of leather, or other friction material, 58 is inserted between the friction disk 49 and 52 and the leather or friction material is compressed between said disks by means of the spiral spring 59 which is mounted on the outer end of the shaft 47 and which bears against the end of the sleeve 51 and the inside of the nut 50, thus drawing the disk 49 against the leather or friction material, and that in turn against the friction disk 52. The friction on the friction disk may be increased or decreased by screwing the nurled nut 50 in or out upon the shaft 47.

When the rolls of material that have been cut are very small much less friction is required to wind it tightly than when they increase to a size of several inches, and in order to increase the friction as the size of the roll increases, I provide an arrangement which is shown in Figs. 3 and 16. This arrangement consists of a dog 60 which is mounted on the shaft 61. The shaft 61 is held in adjusted position by the friction produced by the tension screw 62. With the dog 60 in the position shown in dotted lines Fig. 16, as the shaft 47 revolves the lugs 63 will come in contact with the point of the dog 60 and prevent the nurled nut 50 from turning with the shaft, so that as the shaft turns, the threads being left-handed, the nut 50 will be screwed upon the shaft 47 and tighten the tension of the spring 59 to increase the friction between the disks 49 and 52 and the leather or frictional insert 50. This frictional insert may be leather, cloth or any material sufficient to produce the desired friction. The friction device is more or less automatic, for as the nut 50 is screwed upwardly the point 63 will be gradually moved inwardly until it clears the end of the dog 60, when the nut will revolve with the shaft. The position of this dog 60 may be adjusted by moving the shaft 61 lengthwise in its bearing 64. It may be moved by loosening the adjusting screw 62 which serves to clamp the shaft 61 in the bearing 64. The shaft 47 is provided with a slot extending throughout its length, the slot running in to the hub of the bearing 48. The outer end of the shaft, as shown in Fig. 2, has a slot 67 adapted to receive the pin 68 which passes through a long clamping bar 69. This clamping bar 69 fits loosely in the slot.

The material is bound to the shaft 47 in the following manner:—The clamping bar 69 is removed and the material laid laterally across the shaft and the slot in the shaft. Then the clamping bar 69 is laid upon the cloth and pushed down into the slot and the end 70 of the clamping bar pressed inwardly into the bearing 48 until the pin 68 is pressed into the lateral slot 67, thus binding the cloth in the slot so that it will not pull out. When the material cut has been wound up into rolls of sufficient size the clamping-bar 69 can be pulled out lengthwise, loosening the inner end of the rolls from the shaft 47 so that they may be slipped off endwise.

The shaft 47 and the mechanism mounted on it is rotated outwardly on the bearing 47$^a$ as the rolls of material increase in size, the shaft 3 acting as a pivot so as to permit said rotation. This rotative movement of the shaft 47 on its bearing 47$^a$ on the shaft 3 also provides for the easy removal of the rolls of cut material.

The mechanism for holding the material to be cut with sufficient friction to keep it smooth, and to guide it edgewise to the cutters, consists of the bars 71, 71, which are attached to the end pieces 2, 2, by means of the rod 72 which passes through their ends and which is provided with the nuts 73, 73, on its outer ends. The cloth first passes over rods 74, 75, which are attached to side pieces 76, 76, which side pieces are pivoted to the side bars 77 by the pivot rod 78. The purpose of pivoting the bars 74 and 75 is so that they may be revolved on the pivot 78 and the surfaces of the cloth brought against each other to produce friction. The cloth then passes up over the bar 79, under the bar 80, back under the bar 81, over the bar 82, under the bar 83, and over the bar 84, thence under the roll 38 and up over the hardened roll or platen 18, cut, and is then wound upon the shaft 47. The bar 80 is secured in the side pieces 85 and 86, which are in turn secured to the bar 79. The bar 79 revolves in bearings in the side pieces 71, 71. The bearings in the outer ends of the side pieces 71 are slotted through and provided with binding screws 87, 87, so as to produce more or less friction on the bar 79. The purpose of this arrangement is so that the cloth as it comes over the bar 79 and under the bar 80 may be caused to rub against itself with more or less friction by depressing the bar 80; the bar 80 being swung by the handle 88 which is formed on the end of the bar 79.

The material to be cut is guided to the cutters by the adjustable guide 89 which has a bearing upon the rods 79, 81 and 82, and is provided with the binding screw 90 to secure it in its adjusting position, and the yielding guide 91 which has a bearing upon the rods 79, 81 and 82, and is free to slide laterally thereon. The guide 91 is pressed against the edge of the material by the spring 92 which is mounted upon the rod 81. One end of the spring 92 bears against the side of the guide 91, and its other end against the adjustable collar 93. The collar 93 is mounted on the rod 81 and is adjustably secured thereto by the binding screw 94. Thus, we have a fixed guide for one edge of the material and a yielding guide for the other edge, which is kept against the edge of the material by the tension of the spiral spring 92; this tension being adjusted so as to permit the guide 91 to yield slightly to the slight inequalities in the width of the material.

The operation of my improved cutting machine is as follows:—The material to be cut may be in rolls or in bolts, as cloth or similar material is usually put up, and unwound from such packages and passed over the rod 75, under the rod 74, back over the rod 79, under the rod 80, back over the rod 79, under the rod 81, over the rod 82, under the rod 83, over the rod 84, under the roll 38, up over the roll or platen 18, and wound around the winding shaft 47 and secured thereto by the clamping rod 69.

Cutting pressure is exerted upon the cutters 27 through the bearing 23 upon the hubs 26 of the cutters through the spiral spring 32 and the pins 29, which serve as a bearing for the truss frame 28; the truss frame 28 being straight on its underface and having a bearing on the upper ends of all the pins 29 in the holders 23. As the adjusting screw 30 is pressed down, it has a uniform bearing upon all said pins 29, the pressure of the cutters 27 on the platen or roll 18 being dependent upon the tension of the spiral springs 32, which tension may be varied by putting in different size springs or by putting in place of the plugs 29 plugs of greater length. The cutters 27 are kept in place by the holders 23 which have bearings and are mounted upon the shaft 22, and laterally adjustable thereon and held in their adjusted position by means of the adjusting screws 25, the point 25$^a$ of which enters the lateral notches or grooves 24. This form of adjustment permits slight rotative movement of the holders 23.

The roll or platen 18 is revolved by means of the gears 16 and 17 through the shaft 3 which has the pulleys 4 and 5 mounted thereon. The cutters 27 are revolved by means of the shaft 21, which has grooves 21$^a$ formed therein, adapted to receive the lugs 21$^b$ which project from the walls of the hole in the cutter. This shaft 21 is revolved by means of a gear 19 mounted on the roll or platen 18 enmeshing in the gear 20 which is secured to the end of the shaft 21, the shaft 21 revolving in bearings in the end frames 2, 2. The material is fed through the cutters by the friction produced by pressing it between the yielding roll 38, which is preferably made of rubber or similar material, and the platen or roll 18, and is assisted by the pull of the winding shaft 47, which is frictionally driven from the shaft 3 by means of the gears 54, 55 and 57, the friction disks 49 and 52 and friction material 58, the tension on the friction being adjusted by the nut 50 through the medium of the spiral spring 59.

The distance between the cutting blades 27 may be varied by adjusting the holders 23 laterally upon the shaft 22, or if it is desired to cut a strip of material of a width equal to the width between the outside cutters into say two or three strips, it can be done by raising the truss presser bar 28 a sufficient distance to permit the removal of all the pins 29 from the holders 23 except in those holders where it is desired to cut the material; then by pressing down the bar 28 upon the pins which remain in the holders, pressure will be exerted on the cutters in which the pins have been left, to cut the material, while the other cutters will simply ride upon the material without cutting or marring it. This furnishes a very convenient, quickly adjusted, and economical method of varying the widths of the strips to be cut and the number of strips into which the full width of material is to be cut.

The cutters may be removed for sharpening or replacement by first screwing out the sleeve 96, which is screw-threaded into the frame 2, until said sleeve leaves a space equal to the width of the hubs of the cutters between it and the end of the shaft 21. This will give space enough to permit the removal of the cutter. Then, the presser bar 28 is moved upwardly to its highest position to permit the holders 23 to rotate upwardly on the shaft 22 a sufficient distance to release the bearing and the guides of the holders from the cutter 27. The cutter may then be moved laterally on the shaft 21 and removed through the space between the end of the sleeve 96 and the end of the shaft 21.

To remove the holders 23, the presser bar 28 should be moved upwardly to clear the plugs in the holders, the adjusting screw 25 screwed outwardly until its point 25$^a$ clears the notches in the shaft 22, and the sleeve 95 screwed out until the space between its inner end and the end of the shaft 22 is greater than the thickness of the holders 23; then the holders can be rotated to clear the cutters 27 and moved laterally clear of the shaft 22 and removed therefrom through the space between the end of the sleeve 95 and the end of the shaft 22.

I do not confine myself to the exact form of the frame of the machine, or location of the bearings of the shafts or form of holders, presser bars, winding bars, etc., as they may be varied in form and location without departing from the spirit of my invention.

What I claim is—

1. A cutting machine comprising a frame; a roll or platen rotatively mounted in said frame; means for rotating the roll or platen; rotary cutters; holders forming bearings and guides for said cutters, adjustable transversely in said frame and arranged so that they will cause the cutting edges of the rotary cutters to come in cutting contact on the roll or platen; means for exerting a cutting pressure on said cutters; and means for positively rotating said cutters.

2. In a machine for cutting cloth, a frame; a roll or platen rotatively mounted in bearings in said frame; means for rotating said roll or platen; rotary cutters, holders for said cutters, a shaft on which said holders are adjustable transversely, and means for positively rotating said cutters.

3. A cutting machine for cloth, leather and similar materials, comprising a frame; a roll or platen rotatively mounted in said frame; rotary cutters, holders which constitute bearings for said rotary cutters and guide the same laterally; and means for separately rotating the rotary cutters.

4. In a rotary cutting machine, a frame; a roll or platen rotatively mounted in said frame; rotary cutters, in cutting contact with the roll or platen; holders forming bearings for the rotary cutters and guides for guiding them laterally; means for adjusting said holders laterally; means for exerting a cutting pressure through the medium of said holders upon said rotary cutters, and means for separately driving the said cutters.

5. In a rotary cutting machine for cutting cloth, leather and similar materials; a frame; a roll or platen rotatively mounted in said frame; rotating cutters; means for rotating said cutters independent of the means furnishing a bearing therefor; holders forming bearings for the cutters; and a presser bar adapted to exert a cutting pressure on the rotary cutters through the holders forming bearings for same.

6. In a rotary cutting machine for fabrics, a frame; a roll or platen mounted in said frame; rotating cutters in cutting contact with said roll or platen; means for rotating the cutters independent of the bearings for same; holders or guides in which said cutters have a bearing and which guide the same laterally; means for exerting a cutting pressure on each of said cutters independently of the others; means for feeding the material to said cutters; means for producing a tension on said material as fed to the cutters; means for guiding the material edgewise; means to secure the material to a shaft for winding it into rolls; and means for driving said winding shaft to wind the material into rolls.

7. In a machine for cutting fabrics, frames having bearings therein; a roll or platen mounted in said frames; a plurality of rotary cutters; a plurality of holders furnishing bearings and guides for said cutters; means for exerting a cutting pressure on each of said rotary cutters, acting independently of the other cutters; means for feeding the material to said rotary cutters; a material winding shaft; means for securing said material to the winding shaft; and means for winding said material as it is cut into strips into rolls upon said winding shaft, and for producing a tension on the material as wound.

8. In a machine for cutting cloth or similar materials, having a platen; rotary cutting knives in cutting contact with the platen; bearings and guides for said rotary cutting knives, consisting of a holder having bearings for the hubs of the cutters formed therein, and slots in said bearings forming wings to inclose the cutting blades and guide them laterally; means for mounting the holders, comprising a shaft fixed in the frames of the cutting machine to form a fulcrum; notches in said shaft; an adjusting screw for adjustably and yieldingly securing the holders laterally upon said shaft; and means for exerting a cutting pressure on spring-controlled pins mounted in said holders to produce a cutting pressure on the rotary cutters.

9. A roll winding device for rotary cutting machines, comprising a winding shaft; frictional means for driving the winding shaft with varying tensions upon the friction device; and means for manually decreasing and increasing the friction on the tension, together with means for automatically varying the given tension on the friction driving device.

10. Means for winding strips of material into rolls, comprising a shaft around which the material is wound; frictional driving means for rotating said winding shaft, arranged to slip to retard the rotary movement of the shaft as the rolls of material increase in size; and means to increase the frictional contact of the friction surface automatically as the rolls of material increase in size.

11. In a rotary cutting machine, means for producing tension on the material, comprising side bars secured to the frames of the machine; cross-bars secured to the side bars over and around which the material may be led; means by which the cross-bars may rotate about each other to permit the material to rub against itself with varying pressure; stationary bars over and under which the material may be led; and a second cross-bar secured to side bars which are pivotally secured to the frame of the tension device and adapted to be rotated on the pivot to cause the material to rub against itself as drawn through the tension device with varying degrees of pressure, the variations in pressure being caused by the amount of rotation of the movable guide bar.

12. In a rotary cutting machine, a guiding device comprising guiding bars around which the material is drawn; and edge-guides mounted upon said guiding bars and arranged to move laterally, one being adjustably secured, and the other being yieldingly pressed against the material by a spring which is adjustably mounted on the material guiding device.

13. In a rotary cutting machine having a friction winding mechanism; means for adjusting the friction on said winding mechanism, comprising a disk on the winding bar; a sleeve mounted upon the winding bar having a disk on one end; friction material between said disks; a spring mounted upon the end of the winding bar which passes through said sleeve; a screw-threaded nut mounted upon said end of the winding bar; and means for manually and automatically screwing said nut against the spring for increasing the friction on the friction material between said disks.

14. In a rotary cutting machine, means for detachably securing the material to be wound to a winding shaft, comprising a shaft having a groove therein extending into the bearing for said shaft; a clamping bar loosely fitted in said groove, one end extending into the bearing to hold it in the groove; a slot in the end of said winding bar extending across the groove; and a pin extending through the clamping bar adapted to slide into said slot to retain the clamping bar in the groove.

15. In a rotary cutting machine having a roll or platen and rotary cutters in cutting contact with said roll or platen; of means for feeding the material to the rotary cutters, comprising a yielding feed roll in contact with said roll or platen between which and the roll or platen the material is fed; means for releasing the feed roll from contact with said roll or platen; and means for increasing or decreasing the pressure of said feed roll upon the roll or platen.

16. In a rotary cutting machine, a roll or platen rotatively mounted therein; rotating cutters in cutting contact with the roll or platen and separate bearings for the respective cutters, in combination with means for rotating said cutters independent of the bearings in which said rotary cutters revolve.

17. In a rotary cutting machine having a roll or platen and rotary cutters in cutting contact therewith, of means for removably mounting the holders and guides for said rotary cutters, comprising a shaft secured in the frame of the cutting machine at one of its ends; a threaded sleeve threaded in the bearing in one of said frames, the inner end of which supports the other end of said shaft, the sleeve being so mounted that it may be unscrewed in its bearings to leave a space between its inner end and the end of the shaft upon which the holders and guides are mounted; notches in said shaft; and adjusting screws threaded in the holders having points which enter said notches in such manner as to prevent lateral movement of the holders, but to permit a slight rotative movement.

18. In a rotary cutting machine having holders and guides for the rotating cutters thereof, comprising a bearing for the hubs of said cutters; side bearings in contact with the blades of said cutters to guide them laterally; a second bearing in said holders adapted to receive a shaft; means for adjustably securing the holders to the shaft comprising lateral notches in the shaft and adjusting screws having points thereon formed to enter the notches to hold said holders and guides against lateral displacement, but to permit a slight rotative movement thereof; a spring in the bearing in said holders or guides; a plug in contact with the end of said spring; a presser bar arranged to contact with said plugs; and means for pressing said presser bar against said plugs to produce a cutting pressure on the rotary cutters.

19. In combination, rotary cutters, a holder or guide for each rotary cutter; means for exerting a cutting pressure on said cutters through the holders or guides; means for adjusting said holders or guides laterally serving to prevent lateral movement of said guides and to permit a slight rotating movement thereof; and means for rotating said cutters.

20. In a rotary cutting machine having means for feeding material to the cutters; means for adjusting the pressure on the feed roll for feeding the material, comprising bearings for the feed roll; pivots upon which said bearings are fulcrumed; swinging contact pieces pivoted to said bearings; an adjusting screw for adjusting the position of said fulcrumed pieces; eccentrics mounted upon a shaft bearing against the said fulcrumed swinging pieces; and means for revolving said eccentrics to cause the feed roll to be pressed against the cutting platen or be moved away from same, as desired.

21. In a rotary cutting machine having a rotating roll or platen; rotary cutters for said machine; means for rotating said cutters; holders in which the hubs of said cutters have a bearing; and means for causing a cutting pressure between said rotary cutters and said roll or platen through the hubs of said cutters.

22. In a rotary cutting machine, a roll or platen; means for rotating same; rotary cutters mounted in holders in said cutting machine; means for rotating the cutters; holders or guides in which said rotating cutters have a bearing and which guide the cutters laterally; means for exerting a cutting pressure on said rotating cutters through said holders or guides; and means for adjusting the holders or guides laterally.

23. In a rotary cutting machine, rotary cutters, holders or guides in which rotary cutters have a bearing; a shaft upon which the holders or guides are mounted in manner to be adjusted laterally; a rotating shaft with which said cutters are in driving engagement, and a rotating platen or roll against which said cutters are pressed with a cutting pressure.

24. A holder or guide having a bearing in which a rotating cutter is mounted; guides to guide the rotating cutter laterally; and a bearing in said holder or guide upon which it is removably and adjustably mounted.

25. In a rotary cutting machine, in combination, rotating cutters, holders in which said rotating cutters are revolubly mounted having lateral guides for the cutters, a support on which said holders are laterally adjustable and also capable of swinging movement, and means acting through said holders to press the cutters with yielding force against the material to be cut.

26. In a rotary cutting machine, rotating cutters; holders in which said rotary cutters are rotatively mounted having guides by which they are guided laterally; means for mounting said holders and guides in the frame of the cutting machine; means for exerting a cutting pressure on said rotary cutters; a rotating roll or platen against which said rotary cutters bear with a cutting pressure; and means for rotating the cutters.

27. In a rotary cutting machine having a roll or platen and rotary cutters which bear against said roll or platen with a cutting pressure; holders in which said rotary cutters are rotatively mounted having guides by which they are guided laterally; means for mounting said holders and guides in the frame of the rotating cutting machine; means for rotating said rotary cutters; and means for feeding the material between said rotary cutters and the rotating roll or platen.

In testimony whereof, I have hereunto set my hand, in the presence of two subscribing witnesses, this the 14th day of April A. D. 1908.

FREDERICK W. STORK.

Witnesses:
A. H. SPENCER,
RICHARD P. ELLIOTT.